(12) United States Patent
Jardine

(10) Patent No.: US 6,280,494 B1
(45) Date of Patent: Aug. 28, 2001

(54) METHOD FOR PRODUCING FERTILIZER GRADE DAP HAVING AN INCREASED NITROGEN CONCENTRATION IN A SPRAY COLUMN

(75) Inventor: Kenneth J. Jardine, Lakeland, FL (US)

(73) Assignee: IMC-Agrico Co., Bannockbum, IL (US)

( * ) Notice: Subject to any disclaimer, the term of this patent is extended or adjusted under 35 U.S.C. 154(b) by 0 days.

(21) Appl. No.: 09/357,832

(22) Filed: Jul. 21, 1999

(51) Int. Cl.$^7$ ..................................... C01B 25/26
(52) U.S. Cl. ................. 71/34; 423/310; 423/313
(58) Field of Search ................. 423/310, 313; 71/34

(56) References Cited

U.S. PATENT DOCUMENTS

| | | | |
|---|---|---|---|
| 1,971,563 | * 8/1934 | Hirschkind et al. | 423/310 |
| 3,415,638 | * 12/1968 | Hemsley et al. | 423/310 |
| 3,419,378 | * 12/1968 | Kearns | 423/313 |
| 3,730,700 | * 5/1973 | Groenveld | 71/34 |
| 3,974,262 | * 8/1976 | Crerar et al. | 423/310 |
| 3,974,263 | * 8/1976 | Crerar et al. | 423/310 |
| 4,370,304 | * 1/1983 | Hendriks et al. | 423/310 |
| 4,485,078 | 11/1984 | Weston et al. | |
| 4,487,750 | 12/1984 | Astley et al. | |
| 4,505,733 | * 3/1985 | Lykov et al. | 423/310 |
| 4,655,789 | 4/1987 | Wiewiorowski et al. | |
| 4,655,790 | 4/1987 | Wiewiorowski et al. | |
| 4,657,559 | 4/1987 | Mollere et al. | |
| 4,710,366 | 12/1987 | Astley et al. | |

OTHER PUBLICATIONS

Official Publication No. 52 (1999), pp ii to v and 63, Association of American Plant Food Control Officials, (no month).
*Manual of Fertilizer Processing*, Marcel Dekker, Inc. (1987), pp. 248 to 251 and 253, (no month).
*The Merck Index*, 10$^{th}$ Edition (1983), p. 561, (no month).

* cited by examiner

Primary Examiner—Wayne Langel
(74) Attorney, Agent, or Firm—Fisher, Christen & Sabol

(57) ABSTRACT

A process of forming a mixture of diammonium phosphate and triammonium phosphate by the reaction of phosphoric acid with gaseous ammonia in a spray column. In the process, the reaction occurs under pressure. With the appropriate selection of the ammonia pressure and the phosphoric acid feed rate sprayed into the spray column, the amount of each of the diammonium phosphate and triammonium phosphate formed can be controlled.

15 Claims, 2 Drawing Sheets

METHOD FOR PRODUCING FERTILIZER GRADE DAP HAVING AN INCREASED NITROGEN CONCENTRATION IN A SPRAY COLUMN

This application is related to the application entitled "Method For Producing Fertilizer Grade DAP Having An Increased Nitrogen Concentration From Recycle", applicants Kenneth J. Jardine et al., filed concurrently herewith, and which is incorporated in its entirety herein by reference.

BACKGROUND OF THE INVENTION

1. Field of the Invention

The invention relates to a method of producing fertilizer grade DAP having increased nitrogen concentration. Fertilizer grade DAP is defined in Official Publication No. 52 (dated 1999) of the Association of American Plant Food Control Officials as a product composed of ammonium phosphates, principally diammonium phosphate, resulting from the ammoniation of phosphoric acid.

2. Background of the Invention

Phosphorus as well as nitrogen are essential plant nutrients. Phosphorus and nitrogen ensure cell multiplication and thus growth since both are structural components of nucleic acids. Plants use the phosphorus and nitrogen to grow. Since fertilizers are generally formed by the reaction of phosphoric acid and ammonia, they are used to provide a rich source of nitrogen and phosphorus to the plants. Such fertilizers are generally applied to the soil and are readily assimilable by plants.

The phosphoric acid used in fertilizers is usually manufactured from rock phosphate typically in one of two ways. Phosphate rock is composed chiefly of calcium phosphates and calcite.

In the first prior art method, commonly known as the furnace acid process, the phosphoric acid is made by heating phosphate rock to a form of relatively pure elemental phosphorus which is then converted into the phosphoric acid. More particularly, this prior art process uses an electric furnace heated to about 1500° K. The phosphate rock is reduced by coke in the presence of sand or silicon dioxide according to the following reaction:

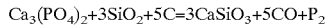

$$Ca_3(PO_4)_2 + 3SiO_2 + 5C = 3CaSiO_3 + 5CO + P_2$$

Gaseous $P_2$ condenses to form a solid $P_4$. In the air, the $P_4$ converts to phosphorus pentoxide. Water is then added to the phosphorus pentoxide to form the phosphoric acid. The process usually yields 85 percent phosphoric acid which is colorless and has a density of about 1.69 kg/L. The phosphoric acid formed by this prior art process generally yields a purer phosphoric acid as compared to the phosphoric acid formed by the second prior art process, which is described below. However, this first process is also much more costly than the second prior art process.

The second prior art method used to produce phosphoric acid is known as the wet process. Most of the phosphoric acid produced in the United States is produced by this process. In this wet process, finely ground phosphate rock is slurried with sulfuric acid. Sometimes, recycled dilute phosphoric acid is included in the slurry. The reaction that occurs in this wet process is set forth below:

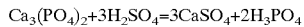

$$Ca_3(PO_4)_2 + 3H_2SO_4 = 3CaSO_4 + 2H_3PO_4$$

In addition to the orthophosphoric acid, the reaction yields gypsum and numerous other suspended and dissolved impurities. The slurry is generally filtered to remove the solid impurities, mainly, gypsum. The resultant filtrate contains between 25 and 35 percent $P_2O_5$ and between 1 and 8 percent by weight of suspended solids or impurities that are not removed by the filtration process. Examples of wet process methods are disclosed in U.S. Pat. Nos. 4,487,750, 4,485,078, 4,657,559, 4,665,790 and 4,655,789, which are incorporated herein in their entirety. U.S. Pat. No. 4,710,366 discloses methods of removing further impurities from the filtrate; such patent is incorporated herein in its entirety.

As used herein, the terms phosphoric acid and wet process phosphoric acid mean orthophosphoric acid.

Phosphoric acid is reacted with anhydrous ammonia to form ammonium phosphates, which constitute a large class of phosphorus fertilizers. See Examples 7 and 9 of U.S. Pat. No. 4,485,078. The common ammonium phosphates include monoammonium phosphate and diammonium phosphate, which are the primary components of the fertilizers commonly known as MAP and DAP, respectively. The phosphoric acid is preferably reacted with the proper proportion of anhydrous ammonia which primarily provides diammonium phosphate, which is a source of nitrogen and phosphorus readily assimilable by food crops.

An example of the formation of ammonium phosphate from wet process phosphoric acid is described in *Manual of Fertilizer Processing*, edited by Francis T. Nielsson, Marcel Dekker, Inc., (1987), on page 253 under the title "Spray Tower Process". The article notes that in 1965, L. B. Nilsson described a spray tower process for producing ammonium phosphate from wet process phosphoric acid. The acid was sprayed into an ammonia atmosphere in a tower. The heat of reaction between the ammonia and the acid was sufficient to evaporate the water in the acid droplets, and the product was removed as a dry powder from the bottom of the tower. To make DAP, phosphoric acid with a minimum concentration of about 45 percent $P_2O_5$ was required. A weaker acid solution might contain more water than what could be evaporated by the heat of reaction. If the heat of reaction was not sufficient to evaporate the water in the acid and compensate for any losses from the tower, additional heat had to be supplied. The product from the process was not as acceptable because the material was a fine powder and the bulk density was low. A granulation step would be required for product acceptance. The only compound mentioned in the article is diammonium phosphate, which implies an N/P mole ratio of 2. There is no mention in the article of triammonium phosphate (N/P mole ratio of 3), or production thereof. Also, there is no mention in the article of the use of elevated pressures.

The TVA (Tennessee Valley Authority) in the early 1960s developed a process for the preparation of granular DAP from ammonia and phosphoric acid. The conventional TVA process for preparing granular DAP is described on pages 248 to 251 of *Manual of Fertilizer Processing*, ibid. The conventional TVA type of process has a preneutralizer for partial ammoniation of the phosphoric acid and completion of ammoniation is done in a rotary ammoniator-granulator. Granulation is controlled by recycling product fines to the drum. The basic TVA process involves partial preneutralization of the acid in a preneutralizer (reaction tank) followed by completion of ammoniation to DAP in the rotary ammoniator-granulator. Excess ammonia, which must be fed to the ammoniator-granulator to produce DAP, is recovered by scrubbing the off gases with the acid to be used in the process. The granular product is normally dried, cooled, and screened, having the undersized and crushed oversized granular DAP recycled to the granulator to control granulation.

Pure diammonium phosphate [$(NH_4)_2HPO_4$] is also termed dibasic ammonium phosphate. Page 561 of *The Merck Index*, 10$^{th}$ Ed., (1983), states that diammonium phosphate gradually loses about 8 percent $NH_3$ on exposure to air.

Triammonium phosphate is $(NH_4)_3PO_4$.

DAP (fertilizer grade) is defined as a product composed of ammonium phosphates, principally diammonium phosphate, resulting from the ammoniation of phosphoric acid.

BROAD DESCRIPTION OF THE INVENTION

An object of the invention is to provide a process for producing DAP having increased ammoniacal nitrogen concentration. Another object of the invention is to provide a process for producing DAP fertilizer using the lower quality orthophosphoric acid currently being produced, without using expensive nitrogen supplements. A further object of the invention is to provide a process for the production of fertilizer grade DAP. Other objects and advantages of the invention are set forth herein or are obvious herefrom to one skilled in the art.

The objects and advantages of the invention are achieved by the process of the invention.

There currently exists a need for a process to produce ammonium phosphate from orthophosphoric acid, having a high concentration of impurities. Furthermore, a need exists for increasing the nitrogen content of DAP used for fertilizers. The invention provides a solution to such needs.

The invention involves a process for the preparation of diammonium phosphate as well as some triammonium phosphate by spraying orthophosphoric acid into an atmosphere of only pressurized gaseous ammonia. The process involves control of the reaction between phosphoric acid and ammonia to produce the desired amount of diammonium phosphate and triammonium phosphate.

The invention method for producing a mixture of triammonium phosphate and diammonium phosphate involves spraying phosphoric acid into a vapor tight vessel that has been preconditioned by removing as much air as possible and replacing the air with anhydrous gaseous ammonia. The vessel is preferably a spray column. The phosphoric acid droplets preferably have a diameter of 30 to 90 microns. The ammonia inside of the vessel can be at any pressure, generally 15 psia or above, such that the ammonia exists as a gas. Inside of the vessel the phosphoric acid will react with the ammonia and fall to the bottom of the vessel as very small particles. The small particles can be removed on a batch basis or continuously. Gaseous ammonia is fed into the vessel at a rate sufficient to replace the ammonia that reacts with the phosphoric acid and maintain the desired pressure. The proportions of diammonium phosphate and triammonium phosphate formed in the vessel are controlled by the ammonia pressure and the phosphoric acid feed (spray) rate. Higher ammonia pressures and lower phosphoric acid feed rates both favor a higher proportion of triammonium phosphate. Preferably, excess heat and moisture can be removed from the reaction vessel in a gas circulation loop having a cooled condenser and liquid trap, and recycling the ammonia to the reaction vessel. The product in the form of very small particles can be granulated by themselves and used as a high-nitrogen fertilizer. Also, the product from the reaction vessel can be fed to a granulator having DAP, and, thereby, be incorporated into the granulated DAP product thereof.

Practice of the invention process results in enhancement of the ammoniacal nitrogen concentration of DAP above what can normally be obtained, with a given acid quality, from a standard TVA style DAP plant using a preneutralizer and a granulator.

The invention process comprises the direct production of a mixture of DAP and triammonium phosphate by spraying a fine mist of (wet process) orthophosphoric acid into a vessel containing gaseous ammonia which is preferably at least 99 percent pure, at atmospheric pressure and preferably at elevated pressures. The invention process produces DAP fertilizer with the lower quality phosphoric acid currently being produced, without using expensive nitrogen supplements. A higher analysis fertilizer with, for example, a phosphate concentration (expressed as percent $P_2O_5$) of about 48 percent and an ammonia concentration (expressed as percent N) of about 20 percent, can be achieved by the invention process.

The conventional TVA type of process has a preneutralizer for partial ammoniation of the phosphoric acid and a rotary ammoniator-granulator for completion of the ammoniation. Granulation is controlled by recycling product fines to the drum. The TVA process involves partial preneutralization of the acid in a preneutralizer (reaction tank) followed by completion of ammoniation to DAP in the rotary ammoniator-granulator. Excess ammonia, which must be fed to the ammoniator-granulator to produce DAP, is recovered by scrubbing the off gases with the acid to be used in the process. The granular product is normally dried, cooled, and screened, with the undersized and crushed oversized granular DAP being recycled to the granulator to control granulation. The product of the invention can also be fed to the granulator of the TVA process to enhance the ammoniacal nitrogen concentration of the product of the TVA process.

One preferred embodiment of the invention involves improving the granular DAP product of a conventional TVA type of process. The conventional TVA type of process involves partially preneutralizing orthophosphoric acid with ammonia, completing the ammoniation of the orthophosphoric acid in a rotary ammoniator-granulator to provide granular DAP, sizing the granular DAP to provide the granular DAP product, reducing the particle size of the oversized granular DAP, and recycling the undersized granular DAP and the sized-reduced oversized granular DAP to the ammoniator-granulator. The invention embodiment involves the improvement of enhancing the ammoniacal nitrogen concentration of the granulated DAP recycle, hence the granular DAP product, by adding the invention mixture of DAP and triammonium phosphate to the recycle of the TVA process.

DETAILED DESCRIPTION OF THE INVENTION

The invention provides a process for increasing the amount of ammoniacal nitrogen in a composition comprising DAP. In addition, the invention provides a process for forming a composition comprising diammonium phosphate as well as triammonium phosphate.

Figure 1:
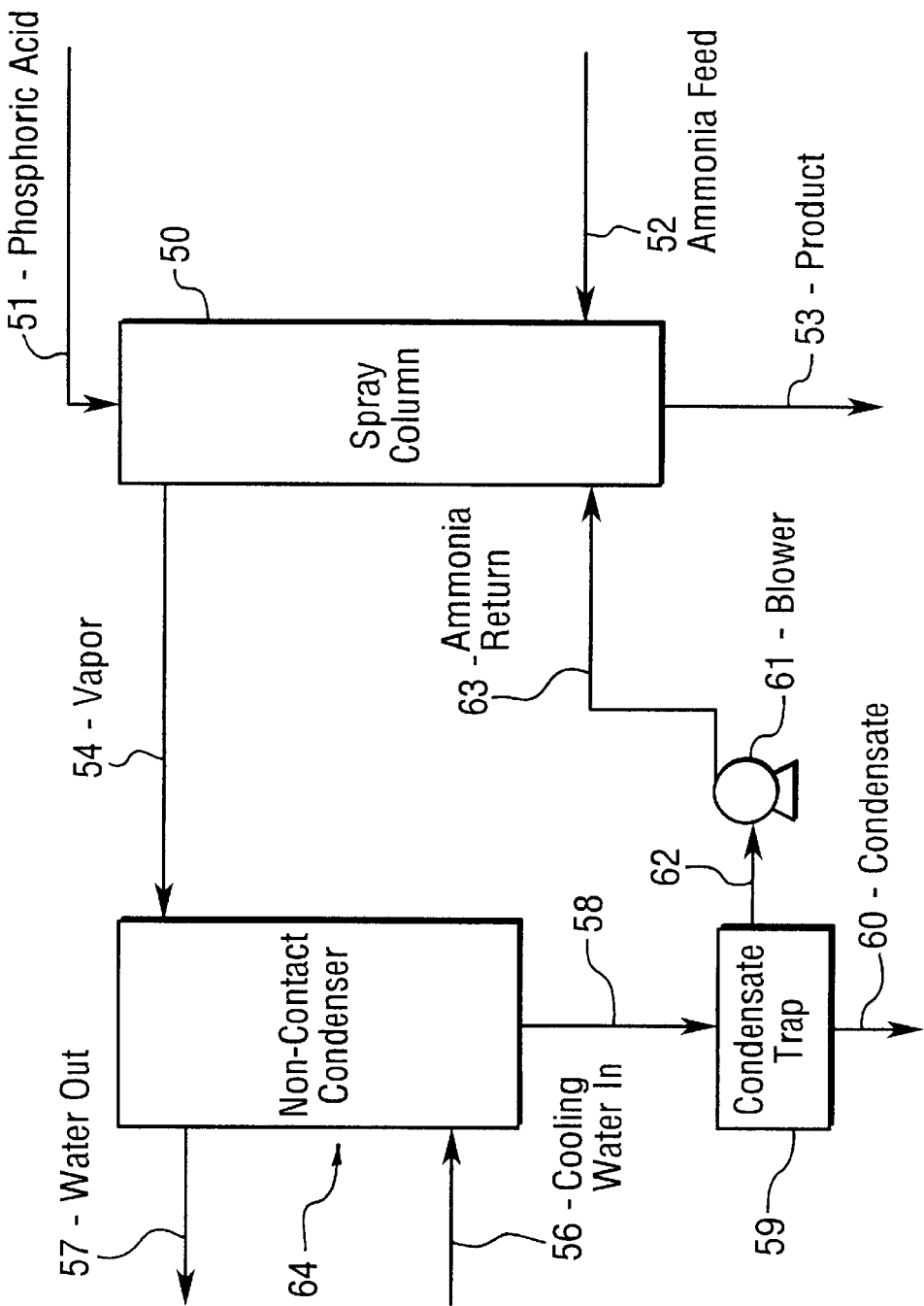
FIG. 1 is a schematic of the spray column with a gas circulation loop.

A schematic of the invention process using spray column 50 with gas circulation loop 64 is shown in FIG. 1. Orthophosphoric acid is fed via line 51 to the top of spray column 50. Gaseous ammonia is fed via line 52 into the bottom portion of spray column 50. Product, that is, a mixture of diammonium phosphate and triammonium phosphate, in the form of very small particles, is removed via line 53 from the bottom of spray column 50. Gas circulation loop 64 includes non-contact condenser 55, condensate trap 59 and blower 61. Vapor from the top portion of spray column 50 is fed via line 54 into the top portion of non-contact condenser 55. Cooling water is passed via line 56 into the start of the cooling pipes or coils (not shown) at the bottom of non-contact condenser 55. The cooling water exits the cooling coils via line 57 near the top of non-contact condenser 55. The vapor traversing downward in non-contact condenser 55 is cooled by heat exchange with the cooling coils (not shown) in which there is upward traversing cooling water. The cooled vapor, which at this point contains gaseous ammonia and moisture in mist form, exits via line 58 the bottom of non-contact condenser 55 into the top of condensate trap 59. The gaseous ammonia exits via line 62 from condensate trap 59 into blower 61. The gaseous ammonia is forced via line 63 by blower 61 into the bottom portion of spray column 50.

The invention process requires a column which is vapor tight and can be pressurized. The column must also be a spray column, a spray tower or similar vessels capable of creating a spray therein. The column must contain means for introducing a fine mist (spray) of orthophosphoric acid at one or more locations in the upper portion of the column, such that the resulting droplets will not impinge directly upon the walls of the column, but rather will fall down the length of the column in an essentially unaltered state with regard to droplet size. Also the column should be of sufficient length to allow the phosphoric acid droplets time to react with the gaseous ammonia in the column. The exact size (i.e., diameter and length) of the spray column can be easily determined by one skilled in the art dependent upon the exact process being practiced.

To start the process, the column and any associated vessels and piping are first evacuated to remove air. Preferably, a vacuum of at least 24 inches of mercury is obtained in the spray column. While the process will function without first evacuating the air, any air present in the column will dilute the ammonia that is to be added to the column and reduce the efficiency of the process. The spray column is then filled with anhydrous, gaseous ammonia and pressurized until the desired (predetermined) pressure is reached in the spray column. The ammonia used should be at least 99 percent pure. While the process will operate with gaseous ammonia at atmospheric pressure, advantageously gaseous ammonia at superatmospheric pressure is used. Preferably the pressure is at least 15 psia, more preferably the pressure is between 15.2 psia and about 35 psia, and most preferably the pressure is 30 psia or higher (e.g., about 100 psia or higher). The higher the pressure, the greater the rate of conversion of the orthophosphoric acid into triammonium phosphate and, therefor the greater the nitrogen in the product. Diammonium phosphate and triammonium phosphate are discrete chemical compounds with the formulas $(NH_4)_2HPO_4$ and $(NH_4)_3PO_4$, respectively. The product of the spray column process is a mixture of these two compounds (the major components) along with several possible other compounds that result from the impurities in the phosphoric acid feed. The novelty of the invention process is the ability to produce significant amounts of triammonium phosphate.

Any type of orthophosphoric acid can be used. Preferably, orthophosphoric acid made from a wet process is used. If orthophosphoric acid formed by the wet process is used in the invention, the orthophosphoric acid should be clarified. The acid is clarified in any standard tank to remove any sediment that results from the formation of the phosphoric acid by the wet process. Any commercially available clarifier can be used. Preferably, a gravity settling clarifier is used. The phosphoric acid must be clarified to the extent that any remaining suspended solids will not clog the spray nozzle. For the apparatus used in Examples 2 and 3, this would be equivalent to a maximum solids concentration of about 0.05 percent (by weight), with a maximum particle size of the remaining suspended solids of no greater than about 50 microns.

Advantageously, the phosphoric acid has a concentration of 44, or less, weight percent $P_2O_5$, and preferably 42, or less, weight percent $P_2O_5$. Higher concentrations of $P_2O_5$ may cause pumping and other problems due to a high viscosity.

The temperature in the column can be any suitable temperature which keeps the ammonia in the gaseous state and which allows production of a product which is a mixture of diammonium phosphate and triammonium phosphate.

The orthophosphoric acid is sprayed into the top of the column. The size of the phosphoric acid droplets in the spray preferably has a diameter of about 30 to about 90 micron, although larger and smaller droplets allow operation of the invention process and provide the desired product are suitable. The size of the droplets of orthophosphoric acid may influence the amount of triammonium phosphate formed by the reaction. A smaller droplet size may lead to a more complete reaction between the phosphoric acid and ammonia, and hence a higher concentration of triammonium phosphate in the product.

The feed rate of the orthophosphoric acid into the spray column, that is, the rate at which the orthophosphoric acid is sprayed into the column, is a very important factor in the operation of the invention process. The rate of the spraying of the phosphoric acid into the column strongly influences the amount of triammonium phosphate formed by the reaction. Preferably the rate of spraying the orthophosphoric acid into the column is about 9.6 liters per hour per square meter of column cross section area to about 31.9 liters per hour per square meter of column cross section area, although faster and slower spraying rates, which allow operation of the invention process and provide a product containing some triammonium phosphate, are advantageous. The phosphoric flow rates used during the tests (i.e., Examples B and C) in an 8 inch diameter by 96 inch long column that produced acceptable product (i.e., N/P mole ratio>2) ranged from 7.1 milliliters per minute to 19.3 milliliters per minute. (The droplet size range was 30 microns to 90 microns.) Based on the test data, the acid flow rate and the ammonia pressure in the column are related. Thus, at higher ammonia pressures, a higher acid flow rate can be used, while at lower ammonia pressures a lower acid flow rate must be used. Also, column size may have an effect on the maximum acid flow rate. A larger diameter, taller column would be expected to-allow use of a higher acid flow rate, while a smaller diameter, shorter column would be expected to require the use of a lower acid flow rate.

In terms of independence versus interdependence, the phosphoric acid feed rate and the ammonia pressure are independent variables with respect to the nitrogen (and hence triammonium phosphate concentration) of the product, since either can be changed independently of the other and produce a different nitrogen concentration in the product. However, in terms of a fixed nitrogen concentration in the product, the two variables would be considered interdependent, since changing one of the two variables would require a compensating change in the other variable to maintain the fixed nitrogen concentration in the product.

By decreasing the rate of phosphoric acid feed introduced, the larger the amount of triammonium phosphate that will result in the product from the reaction. By increasing the gaseous ammonia pressure, the larger the amount of triammonium phosphate that will result in the product from the reaction. The increase in the triammonium phosphate increases the amount of nitrogen in the product.

Ammonia is preferably fed into the column after the operation is started to ensure that the desired pressure or constant pressure in the column exists (and is maintained). The ammonia pressure (within the column) is best monitored. Therefore, gaseous ammonia is preferably fed into the column at a rate sufficient to replace the ammonia that has reacted with the phosphoric acid.

There is no specific time that the spray column must be operated. Most of the tests in Examples B and C were only run for one hour because of fouling problems around the phosphoric acid spray nozzle and because no means was provided for removing the product from the column while it was pressurized. When the mechanical fouling problem is eliminated (e.g., by using a different type of spray nozzle or by modification of the existing spray system) and a continuous means of product removal is provided, the process can be operated continuously. The only time dependence of the process is in terms of the time required for the phosphoric acid droplets to fall through the ammonia atmosphere in the column. In this respect, the column should be of sufficient length to allow the phosphoric acid droplet to react as completely as possible with gaseous ammonia in the column.

The process can also advantageously be run with a gas circulation loop which is added to the column—see FIG. 1. The gas circulation loop can include a condenser and a condensate trap. The purpose of this gas circulation loop is to reduce the amount of product moisture of the product produced by the invention method. Similarly, the process can incorporate other pieces of equipment as mentioned herein and/or as deemed necessary.

The reaction yields a mixture of diammonium phosphate and triammonium phosphate composition having an enhanced amount of nitrogen. The product composition is in the form of dry, very small particles. The product composition can be removed from the columns either continuously or batchwise. This product mixture can be processed into various types of fertilizers by any known means. The product mixture itself can be used (usually after granulation) as a nitrogen-enhanced DAP fertilizer. The invention method produces DAP fertilizer having enhanced ammoniacal nitrogen concentration using the lower quality phosphoric acid currently being produced, without using expensive nitrogen supplements.

The reaction product of the invention generally has a particle size of about 100 to about 200 microns, which is often about 150 microns.

As used herein, all percentages are on a weight basis unless otherwise stated herein or obvious herefrom to one skilled in the art.

This application is related to the application entitled "Method For Producing Fertilizer Grade DAP Having An Increased Nitrogen Concentration From Recycle", applicants Kenneth J. Jardine and Vaughn V. Astley, filed concurrently herewith, and which is incorporated in its entirety herein by reference. Such application involves a process for enhancing the ammoniacal nitrogen concentration of DAP, comprising subjecting said DAP which is in finely divided form, to anhydrous gaseous ammonia which is at a super atmospheric pressure and which is at a temperature sufficient to maintain said ammonia in the gaseous state, the increase in the ammoniacal nitrogen concentration being a function of the absolute ammonia pressure, the initial moisture content of said DAP and the contact time of the ammonium with said DAP. In more detail, a process for the preparation of granular DAP product comprising partially preneutralizing orthophosphoric acid with ammonia, completing the ammoniation of the orthophosphoric acid with ammonia in a rotary ammoniator-granulator to provide granular DAP, sizing the granular DAP to provide the granular DAP product, reducing the particle size of the oversized granular DAP, and recycling the undersized granular DAP and the sized-reduced oversized granular DAP to the ammoniator-granulator. The ammoniacal nitrogen concentration of the granular DAP recycle, hence the granular DAP product, is enhanced by subjecting the finely-divided recycled granular DAP to anhydrous gaseous ammonia which is at a super atmospheric pressure and which is at a temperature sufficient to maintain said anhydrous ammonia in the gaseous state. The increase in the ammoniacal nitrogen concentration is a function of the absolute ammonia pressure, the initial moisture content of the granular DAP recycle, and the contact time of the ammonium with the granular DAP recycle.

DAP (fertilizer grade) is defined in Official Publication No. 52 (dated 1999) of the Association of American Plant Food Control Officials as a product composed of ammonium phosphates, principally diammonium phosphate, resulting from the ammoniation of phosphoric acid.

The following examples serve to further illustrate the invention in greater detail.

EXAMPLE A

This example confirms that, in the production of triammonium phosphate, intimate contact between the phosphoric acid and ammonia promotes a more complete reaction of the phosphoric acid, and, hence, a more complete production of triammonium phosphate. Since ammonia normally exists as a gas, the intimate contact desired could best be obtained by introducing the phosphoric acid, as a very fine spray, into a gaseous ammonia atmosphere (i.e., with as little air present as possible).

A hand sprayer was used to introduce phosphoric acid (about 30 percent) into the top of a straight side separatory funnel with gaseous ammonia flowing into the bottom. This test did not produce a sufficient quantity of sample for a laboratory analysis of the nitrogen and phosphorus concentration, but titration mole ratio analyses run on several samples collected from the walls and bottom of the funnel indicated mole ratios of from 2.26 to 2.63. Since the mole ratio of diammonium phosphate is 2.0, this indicated the presence of some triammonium phosphate.

EXAMPLE B

In view of the data of Example A, a larger spray column, where the diluting air could be removed and where ammonia pressures greater than 1 atmosphere could be maintained, was fabricated. The spray column had an 8 inch diameter and was 96 inches long. The spray column had a bulkhead pressure fitting for an acid spray nozzle.

The operating procedure for the spray column involved, first, evacuating as much air as possible from the column (generally to a vacuum of 24 to 26 inches of mercury). The column was filled with ammonia and pressurized to the desired test pressure (15 to 30 psia). The absolute ammonia pressure used in each test (run) is set forth in Table 1. The acid spray into the column was then started and the ammonia flow adjusted to maintain a constant pressure. The orthophosphoric acid spray was a fine mist of droplets having a particle size of 30 to 90 microns. The column was typically run for about one hour. The phosphoric acid reacted with the ammonia and the reaction product in powder form fell to the bottom of the column. At the end of the test the column was evacuated to remove un-reacted ammonia and then filled with air. The column was then opened and the product was collected.

The conditions in test nos. B-1 to B-5 are set out in Table 1.

TABLE 1

| Test Number | Feed Acid, % $P_2O_5$ | Acid Feed Rate, ml/min | Ammonia Pressure, psia | Average Column Temperature, °F. | Gas Recycle |
|---|---|---|---|---|---|
| B-1 | 41.51 | 7.45 | 15.3 | 130.4° | No |
| B-2 | 41.51 | 19.34 | 15.6 | 154.9° | No |
| B-3 | 41.51 | 7.09 | 29.6 | 150.0° | No |
| B-4 | 41.51 | 16.18 | 29.6 | 164.2° | No |
| B-5 | 41.51 | 12.53 | 22.3 | 149.8° | No |

The column product was analyzed after each test. The results of the analyses of the products formed under the conditions of Table 1 are set forth below in Table 2. The mole ratio of N/P of each of the examples was above 2.0. Since diammonium phosphate has a mole ratio of N/P of 2, a mole ratio of a product greater than 2 indicates that some triammonium phosphate has been formed and is present in the product. Therefore, there was an increase in the amount of nitrogen in the composition of test nos. B-1 to B-5. A problem with test nos. B-1- to B-5 was water removal. Since the column was a closed system, there was no outlet for the water and product moistures ranges from 11.9 percent to more than 27 percent (some water separated as a condensate on the inner walls of the column). It should be noted that triammonium phosphate can exist in a tri-hydrate form [i.e., $(NH_4)_3PO_4 \cdot 3H_2O$] that contains 26.6 percent water. Thus, in sample B-5 in Table 2, with a mole ratio of 2.50, as much as half of the total moisture content could be bound water in the triammonium phosphate.

TABLE 2

| Test Number | % $P_2O_5$ | % N | Mole Ratio, N/P |
|---|---|---|---|
| B-1 | 39.95 | 17.87 | 2.27 |
| B-2 | 39.64 | 14.55 | 2.03 |
| B-3 | 37.14 | 18.39 | 2.51 |
| B-4 | 37.53 | 16.78 | 2.27 |
| B-5 | 36.06 | 17.79 | 2.50 |

EXAMPLE C

The apparatus of Example B was modified to include a gas circulation loop as shown in FIG. 1.

The operating procedure for the spray column involved, first, evacuating as much air as possible from the column and gas circulation loop (generally to a vacuum of 24 to 26 inches of mercury). The column was filled with ammonia and pressurized to the desired test pressure (15 to 35 psia). The absolute ammonia pressure in each test (run) is set forth in Table 3. The acid spray to the column was then started and the ammonia flow adjusted to maintain a constant column pressure. The orthophosphoric acid spray was a fine mist of droplets having a particle size of 30 to 90 microns. The gas circulation loop included a condenser, a condensation trap and a blower. The gas circulation blower was started before the acid spray. The column was typically run for about one hour. The phosphoric acid reacted with the ammonia and the reaction product in powder form fell to the bottom of the column. At the end of the test the column was evacuated to remove un-reacted ammonia and then filled with air. The column was then opened and the product was collected.

The conditions in test nos. C-6 to C-8 are set out in Table 3.

TABLE 3

| Test Number | Feed Acid, % $P_2O_5$ | Acid Feed Rate, ml/min | Ammonia Pressure, psia | Average Column Temperature, °F. | Gas Recycle |
|---|---|---|---|---|---|
| C-6 | 41.51 | 12.6 | 22.1 | 125.1° | Yes |
| C-7 | 41.51 | 11.6 | 29.8 | 152.1° | Yes |
| C-8 | 41.51 | 15.2 | 34.9 | 143.0° | Yes |

The column product was analyzed after each test. The results of the analyses of the products formed under the conditions of Table 3 are set forth in Table 4. The mole ratio of N/P of each of the examples was above 2.0. Diammonium phosphate has a mole ratio of 2. Test nos. C-6 to C-8 provided a mixture of diammonium phosphate and triammonium phosphate.

TABLE 4

| Test Number | % $P_2O_5$ | % N | Mole Ratio, N/P |
|---|---|---|---|
| C-6 | 36.26 | 17.35 | 2.42 |
| C-7 | 35.65 | 17.77 | 2.53 |
| C-8 | 37.66 | 17.06 | 2.30 |

These results indicate that a mixture of diammonium phosphate and triammonium phosphate is formed with phosphoric acid by the reaction of the phosphoric acid and ammonia in a spray column.

EXAMPLE D

In this example, the pressure ammoniation procedure of the (recycle) DAP was as follows:

(a) The weighed quantity of (recycle) DAP was placed in a pressure vessel, which was then sealed.

(b) A vacuum of 24 to 25" Hg was then applied to the sealed vessel to remove the air.

(c) Gaseous ammonia was added to the sealed vessel until the desired pressure was obtained.

(d) The (recycle) DAP was held in the sealed vessel for the required time, with additional ammonia being added to maintain the desired pressure.

(e) A vacuum of 24 to 25" Hg was again applied to the sealed vessel to remove the unreacted ammonia.

(f) Air was bled into the vessel to relieve the vacuum.

(g) A vacuum of 24 to 25" Hg was applied to the vessel again to help remove the last traces of ammonia.

(h) Air was bled into the vessel to relieve the vacuum.

(i) The vessel was opened and the ammoniated (recycle) DAP was removed and weighed.

The pressure ammoniation test was run with a sample of the column product from the spray column test no. C-7 from Example C. The moist sample was sealed in the pressure reactor. A vacuum was then applied to the reactor to remove as much air as possible. The reactor was then filled with gaseous ammonia and pressurized to 45 psia. The reactor was maintained at this pressure for 45 minutes. A vacuum was then applied to the reactor to remove the unreacted ammonia. Air was then bled into the reactor, the reactor was opened, and the sample removed from the reactor. The treated sample appeared dry and had the following analysis; 34.92 percent $P_2O_5$, 20.47 percent N and 21.92 percent $H_2O$. Based on this analysis and the fact that the sample was essentially dry, it was concluded that the sample was essentially triammonium phosphate trihydrate (theoretical composition 34.94 percent $P_2O_5$, 20.69 percent N and 26.61 percent $H_2O$).

The ammoniation process mentioned above also involves a process for enhancing the ammoniacal nitrogen concentration of DAP. The DAP (even if it already contains enhanced nitrogen concentration) which is in finely divided form, is subjected to anhydrous gaseous ammonia which is at a super atmospheric pressure and which is at a temperature sufficient to maintain the ammonia in the gaseous state, the increase in the ammoniacal nitrogen concentration being a function of the absolute ammonia pressure, the initial moisture content of said DAP and the contact time of the ammonium with said DAP. The process is conducted so that the absolute ammonia pressure, the initial moisture content and the contact time have positive values within the scope of the regression equation: % Nitrogen Increase=0.355×Initial % Moisture+0.027×Contact Time (min.)+0.009×$NH_3$ Pressure (psia)−0.240 wherein the coefficients associated with ammonia pressure, the initial percent moisture, the contact time and the constant can each vary plus or minus up to 50 percent.

The product of Example D (before and after the ammoniation) can be incorporated into the DAP recycle of a TVA DAP type process.

Figure 2:
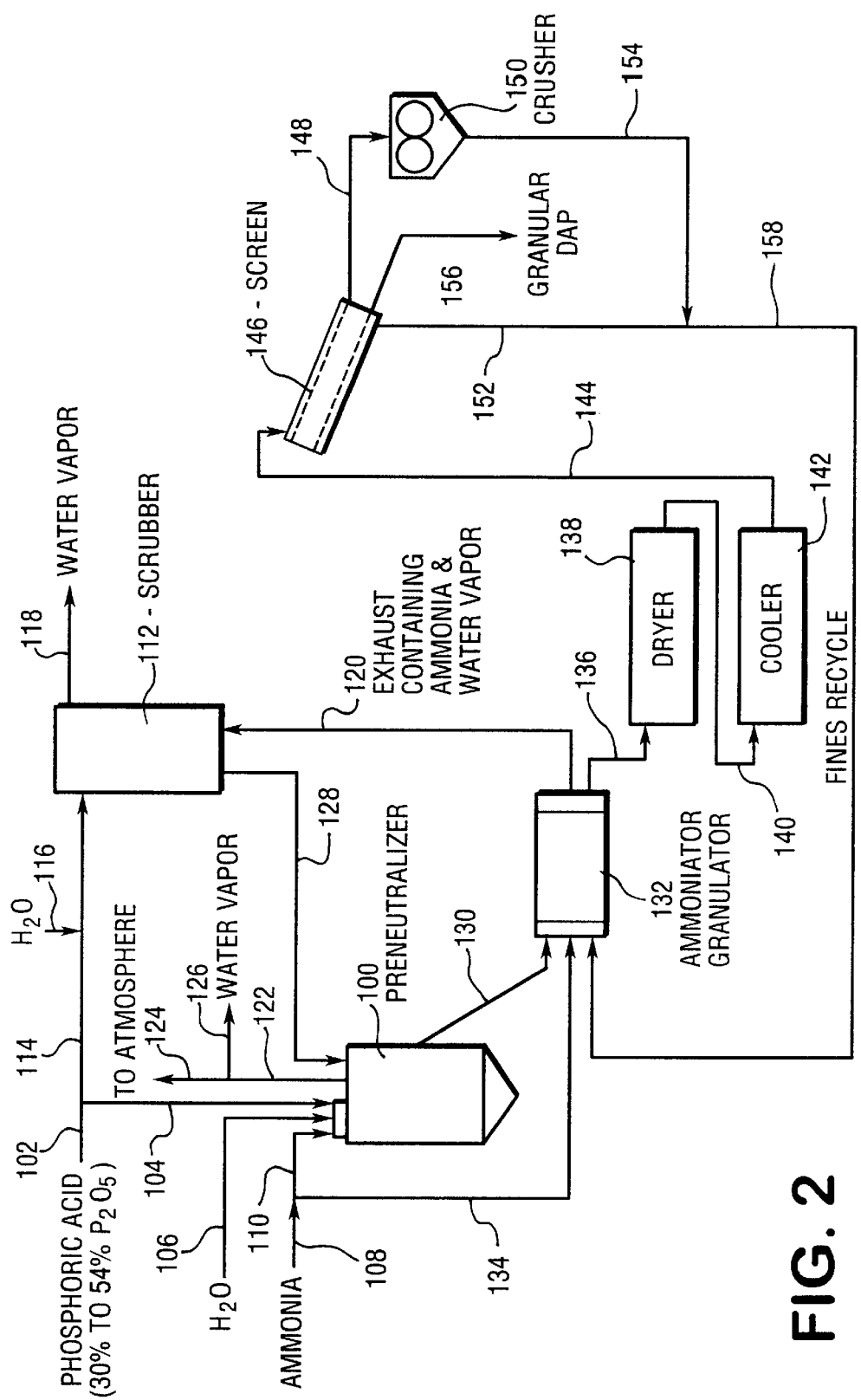
FIG. 2 is a schematic of a conventional TVA process for the production of granular DAP.

The flow path of a conventional TVA (Tennessee Valley Authority) process for the production of granular DAP is shown in FIG. 2. Phosphoric acid (30 to 54 percent $P_2O_5$) is fed into the top of the preneutralizer (reaction tank) 100 via lines 102 and 104. Water is fed into the top of the preneutralizer 100 via line 106. Ammonia is fed into the top of the preneutralizer 100 via lines 108 and 110, and is normally conveyed to a point below the liquid level in the tank. The phosphoric acid is partially preneutralized by the ammonia in preneutralizer 100. The heat of reaction of ammonia and phosphoric acid is used to evaporate water in preneutralizer 100. Preneutralizer 100 is vented to the atmosphere via top line 124 with water vapor coming off via line 126. Further phosphoric acid is fed into the upper portion of scrubber 112 via lines 102 and 114. Water is fed into line 114 via line 116. The solution of the partially preneutralized phosphoric acid is fed from preneutralizer 100 via line 130 to rotary ammoniator-granulator 132. Further ammonia is fed via lines 108 and 134 into ammoniator-granulator 132, wherein the ammoniation is completed. Excess ammonia is required in ammoniator-granulator 132 to produce DAP. The granular product from ammoniator-granulator 132 is fed via line 136 into dryer 138. Exhaust containing ammonia and water vapor from ammoniator-granulator 132 is fed into the bottom of scrubber 112 via line 120. Water vapor comes off of scrubber 112 via line 118. The ammonia is scrubbed out of the off gases from ammoniator-granulator 132 and the phosphoric acid is fed from scrubber 112 via line 128 into the top of preneutralizer 100. The dried granular DAP is fed via line 140 into cooler 142. The granular DAP is fed via line 144 into screen 146. The sized granular DAP product is removed via line 156 from screen 146. The undersized granular DAP exits screen 146 via line 152. The oversized granular DAP is removed from screen 146 and fed via line 148 into crusher 150. The crushed DAP exits from crusher 150 via line 154 and is mixed with the undersized granular DAP from line 152, to form a mixture of fines (DAP dust from the granulator, etc., can be included in the recycle according to the invention). The fines mixture is recycled via line 158 into the front end of ammoniator-granulator 132.

Advantages can be taken of the maximum solubility of the ammonia/phosphoric acid mole ratio of about 1.45; therefore, the preneutralizer 100 can preferably be operated at as near this point as is practical to obtain the most concentrated slurry having satisfactory fluidity. This slurry can either flow by gravity into a sawtooth weir pipe (not shown) for distribution in ammoniator-granulator 132, or be pumped into a sparged spray system (not shown) located over the moving bed (not shown) of dry recycle inside of ammoniator-granulator 132. The later procedure provides more consistent control and better slurry distribution. Ammoniation of the slurry in the ammoniator-granulator drum (not shown) to a mole ratio of 2.0 lowers the solubility and causes crystallization of DAP. The heat of reaction between the monoammonium phosphate in the slurry and the ammonia causes the majority of the water present to vaporize and exit with the granulator off gases.

The particle size of the finely-divided DAP recycle can generally be −14 mesh or less.

What is claimed is:

1. A process comprising spraying orthophosphoric acid into an atmosphere of only pressurized gaseous ammonia with a mixture of solid diammonium phosphate and triammonium phosphate forming such that N/P ratio of the mixture is greater than 2.0.

2. The process as claimed in claim 1, wherein the spraying is conducted in a vapor-tight vessel, the orthophosphoric acid reacts with the gaseous ammonia to form a mixture of diammonium phosphate and triammonium phosphate in the form of about 100 micron to about 200 micron diameter solid particles, the solid particles fall to the bottom of the vessel and are removed continously and/or on a batch basis.

3. The process as claimed in claim 2, wherein the vessel is a spray column.

4. The process as claimed in claim 2, wherein the atmosphere in the spray column is maintained at an average temperature of about 130° to about 165° F.

5. The process as claimed in claim 4, wherein, during operation of the process, any excess heat and moisture is removed from the vessel by circulating the gas from the vessel to a cooled condenser and a liquid trap, with the recovered ammonia recycled to the vessel.

6. The process as claimed in claim 2, wherein the sprayed orthophosphoric acid is in the form of droplets having a diameter of about 30 to about 90 microns.

7. The process as claimed in claim 2, wherein the ammonia gas pressure is at least about 15 psia.

8. The process as claimed in claim 2, wherein gaseous ammonia is fed into the spray column at a rate sufficient to replace the ammonia which has already reacted with the orthophosphoric acid and to maintain the desired ammonia pressure.

9. The process as claimed in claim 2, wherein the mixture of diammonium phosphate and triammonium phosphate has a N/P mole ratio of at least 2.1.

10. The process as claimed in claim 2, wherein the mixture of diammonium phosphate and triammonium phosphate has a N/P mole ratio of at least 2.2.

11. The process as claimed in claim 2, wherein the feed rate of the orthophosphoric acid is about 9.6 liters per hour per square meter of column cross section area to about 31.9 liters per hour per square meter of column cross section area.

12. The process as claimed in claim 2, wherein the N/P mole ratio of the mixture of diammonium phosphate and triammonium phosphate is a function of the absolute ammonia pressure and the orthophosphoric acid feed rate.

13. A process comprising spraying orthophosphoric acid having a concentration of less than 44 weight percent $P_2O_5$, into a column from which as much air as possible has been evacuated and containing pressurized, gaseous ammonia with a mixture of solid diammonium phosphate and solid triammonium phosphate forming such that N/P ratio of the mixture is greater than 2.0.

14. The process according to claim 13 wherein the ammonia is pressurized in the range of about 15 psia or higher.

15. The process according to claim 13 wherein the orthophosphoric acid is wet process orthophosphoric acid.

* * * * *